United States Patent
Weber et al.

(10) Patent No.: US 10,829,226 B2
(45) Date of Patent: Nov. 10, 2020

(54) COMPRESSOR TEMPERATURE CONTROL SYSTEM AND METHOD

(71) Applicant: Textron Aviation Inc., Wichita, KS (US)

(72) Inventors: Scott William Weber, Goddard, KS (US); Clinton Lee Thompson, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 309 days.

(21) Appl. No.: 15/595,154

(22) Filed: May 15, 2017

(65) Prior Publication Data

US 2017/0341757 A1 Nov. 30, 2017

Related U.S. Application Data

(60) Provisional application No. 62/340,816, filed on May 24, 2016.

(51) Int. Cl.
| | | |
|---|---|---|
| *B64D 13/06* | (2006.01) | |
| *F25B 9/06* | (2006.01) | |
| *F25B 9/00* | (2006.01) | |
| *F04B 39/06* | (2006.01) | |

(52) U.S. Cl.
CPC ............ *B64D 13/06* (2013.01); *F25B 9/004* (2013.01); *F25B 9/06* (2013.01); *B64D 2013/0618* (2013.01); *F04B 39/06* (2013.01)

(58) Field of Classification Search
CPC ............ B64D 13/06; B64D 2013/0618; B64D 2013/0648; B64C 2230/04; F25B 9/004; F25B 9/06; F04B 39/06
See application file for complete search history.

(56) References Cited

U.S. PATENT DOCUMENTS

| | | | |
|---|---|---|---|
| 3,259,176 A | 7/1966 | Rice et al. | |
| 5,137,230 A * | 8/1992 | Coffinberry | ............. B64C 21/06 244/118.5 |
| 6,381,969 B1 * | 5/2002 | Afeiche | ................. B64D 13/06 62/87 |
| 8,397,487 B2 | 3/2013 | Sennoun et al. | |
| 2004/0184929 A1 | 9/2004 | Millet et al. | |
| 2009/0260374 A1 | 10/2009 | Wang et al. | |
| 2015/0107261 A1 * | 4/2015 | Moes | ..................... B64D 13/06 60/783 |
| 2016/0144983 A1 * | 5/2016 | Thuong | ................. G01M 17/00 701/31.7 |
| 2017/0305558 A1 * | 10/2017 | Bruno | ................ B60H 1/00321 |
| 2017/0305560 A1 * | 10/2017 | Bruno | ................ B60H 1/00428 |

* cited by examiner

*Primary Examiner* — Elizabeth J Martin
(74) *Attorney, Agent, or Firm* — Erise IP, P.A.

(57) ABSTRACT

A compressor temperature control system and method for an aircraft air cycle machine is presented. The system prevents overheating of the compressor using a low limit valve positioned between a turbine outlet and a bleed air source. The low limit valve directs the air to an air cycle machine, or bypasses the machine, in regards at least in part to the air temperature measured in the cabin supply duct.

13 Claims, 5 Drawing Sheets

COMPRESSOR TEMPERATURE CONTROL SYSTEM AND METHOD

RELATED APPLICATIONS

Figure 1:
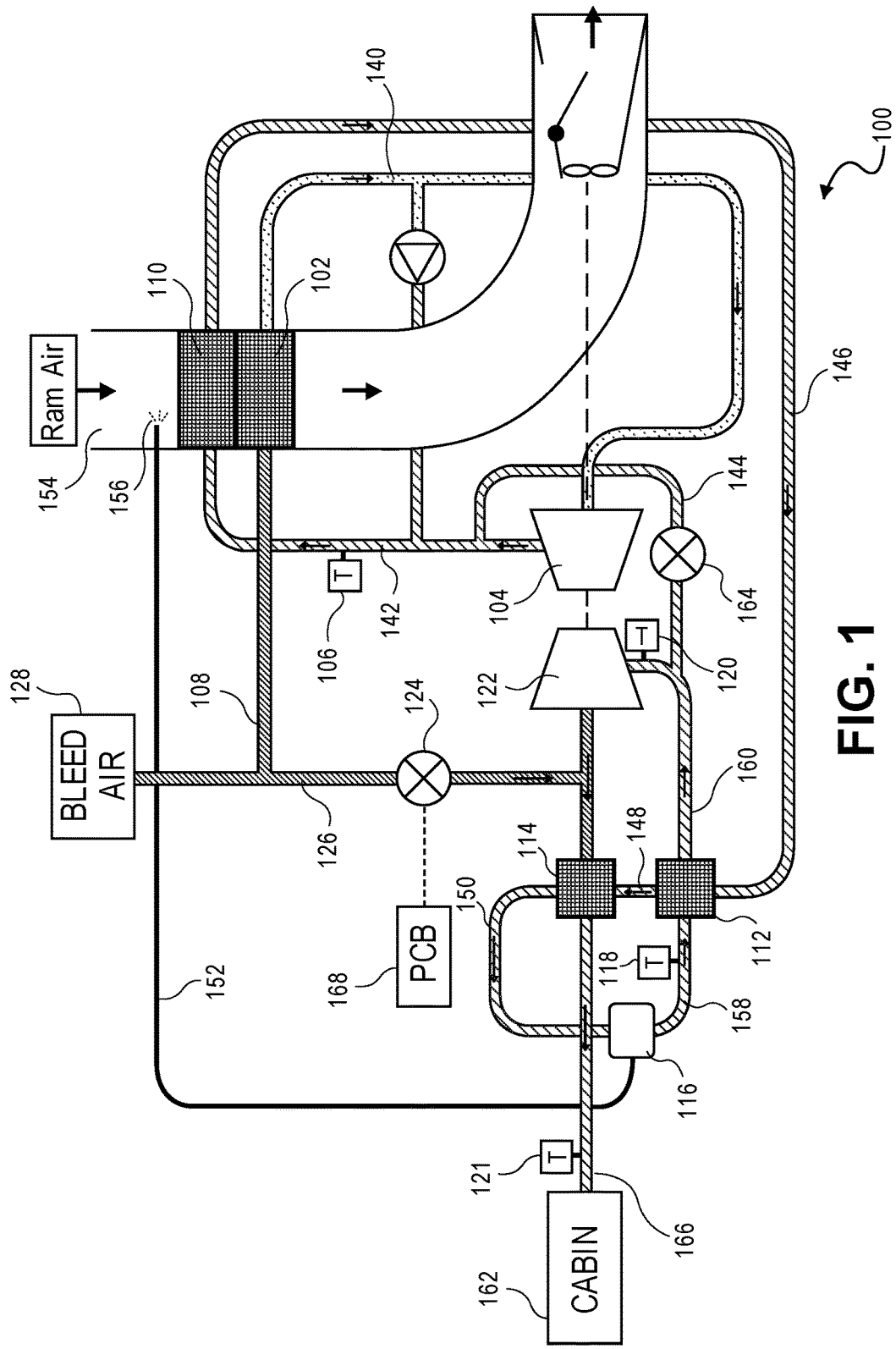

This application claims priority of U.S. Provisional Patent Application No. 62/340,816, filed May 24, 2016, which is incorporated herein by reference.

BACKGROUND

1. Field

The disclosed embodiments relate generally to the field of cycling air in aircraft. More specifically, the disclosed embodiments relate to the field of preventing compressor overheating in an Air Cycle Machine (ACM) of an aircraft.

2. Related Art

Most jet aircraft utilize an ACM for the purpose of air conditioning. An ACM has a basic set of components, one of which is a compressor. An ACM typically receives bleed air from a turbine engine on the aircraft and then upon reaching the compressor, the air temperature is elevated because of the compression. When the air is released from the compressor outlet, a turbine is often used to expand the air resulting in a decreased air temperature. The expanded air being released form a turbine outlet is then introduced into the aircraft cabin. These systems also can have a low-limit valve positioned between the source of bleed air, the turbine outlet, and the cabin. During operation, it is important to keep the ACM compressor outlet temperatures below a level that, when exceeded, will cause damage to the compressor and other ACM components.

Prior art systems have used a system that shuts off the air supply to the air cycle machine (ACM) in the event of a compressor overheat. Upon the occurrence of such an event, the bleed air can only be turned on again once the system has cooled down. In some other conventional arrangements, when an overheat set point is approached, the ACM supply temperature (cold air to the cabin) is controlled to a higher set point until the system cools down, at which point it immediately switches to the lower set point. Essentially, both methods involve a simple trip arrangement where the system identifies that a maximum temperature has been exceeded, issues a warning, and then a user (e.g. pilot) or the controller, sets a higher temperature set point for the cabin or shuts off bleed air to the cabin entirely. These approaches are burdensome to the crew in that they require manual identification of the warning, and then manual correction of the issue. These methods are also inconvenient. When bleed air to the cabin is shut off, due to the loss of cabin pressure, rapid descent to a lower altitude is required.

SUMMARY

Embodiments of the invention solve the above-mentioned problems by preventing overheating of a compressor in an aircraft environmental control system. Bleed air from the engine is received by the compressor. The compressor compresses the air, thus elevating the temperature, and releases the air from the compressor outlet. The air then goes through a series of heat exchangers and a water extractor before entering a turbine. The turbine then receives the air and expands the air, thus decreasing the temperature. The expanded air is then released through the turbine outlet, possibly mixed with bleed air, and is introduced into the aircraft cabin. The bleed air is controlled by a valve (low limit valve) placed between the bleed air source, the compressor inlet, the turbine outlet, and the cabin. A processor is configured to control the valve based on several environmental and aircraft conditions.

In embodiments, air temperature is sensed prior to entering the cabin at the ACM supply duct, water extractor, and compressor outlet. In order to keep air at the compressor outlet within an acceptable range, e.g., below 212.8° C. in an embodiment, the low limit valve is manipulated. To do this, the processor determines low limit valve adjustments using, in embodiments, the ACM supply duct temperature, the water extractor temperature, and the compressor temperature. A logic controller then determines a value for adjusting the openness of the low limit control valve based on sensor validity, ACM supply duct temperature, and aircraft altitude data. This value is stored as the low limit valve adjustment. A low limit valve command is then determined by summing the low limit valve adjustment and the previous low limit valve command. The low limit valve command is restricted between a maximum value and a minimum value. The valve is adjusted to a setting specified by the low limit valve command. This may result in bypassing bleed air around the ACM, thus maintaining the compressor outlet air temperature at the specified temperature range.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Figure 2:
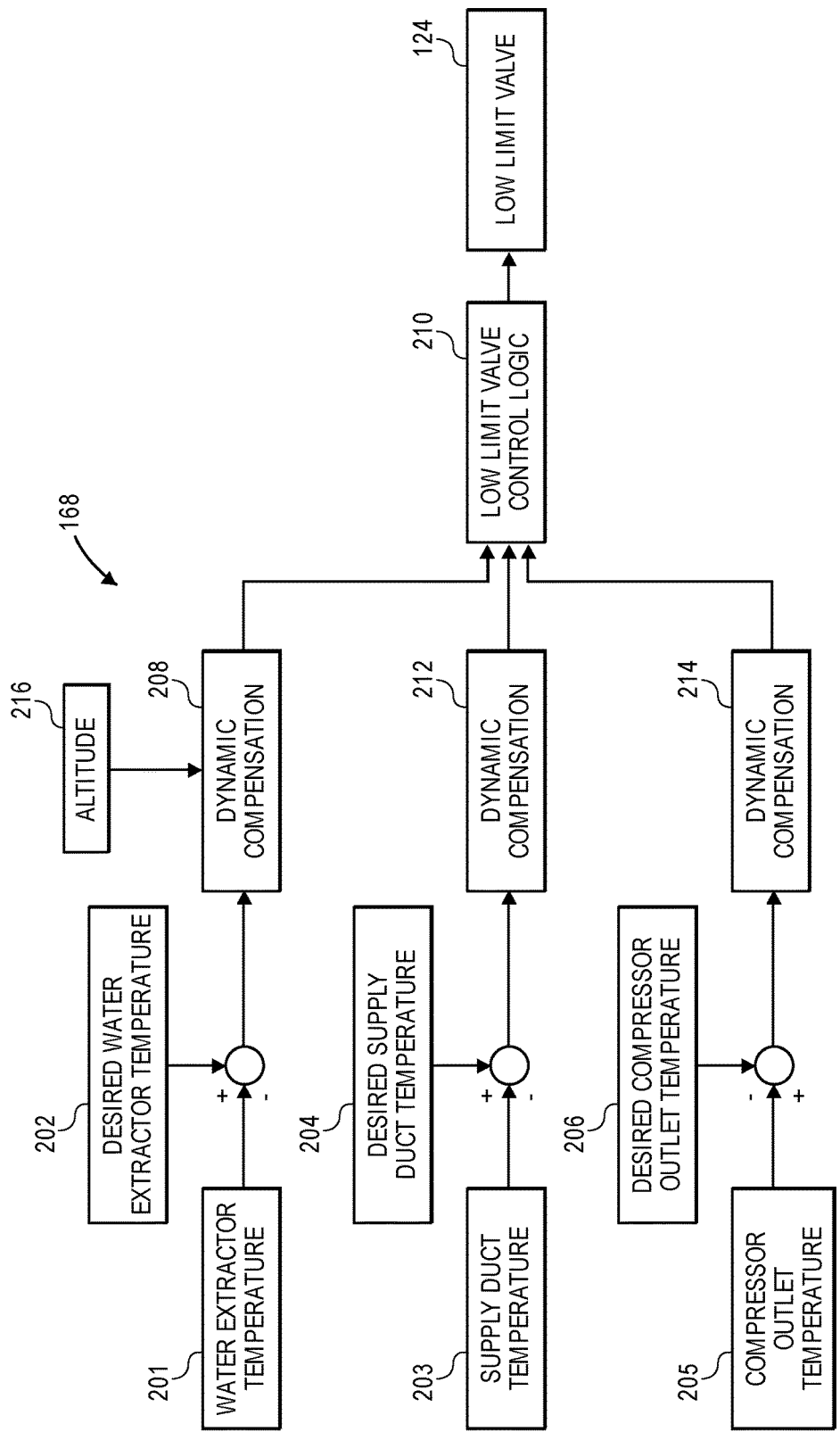
Figure 3:
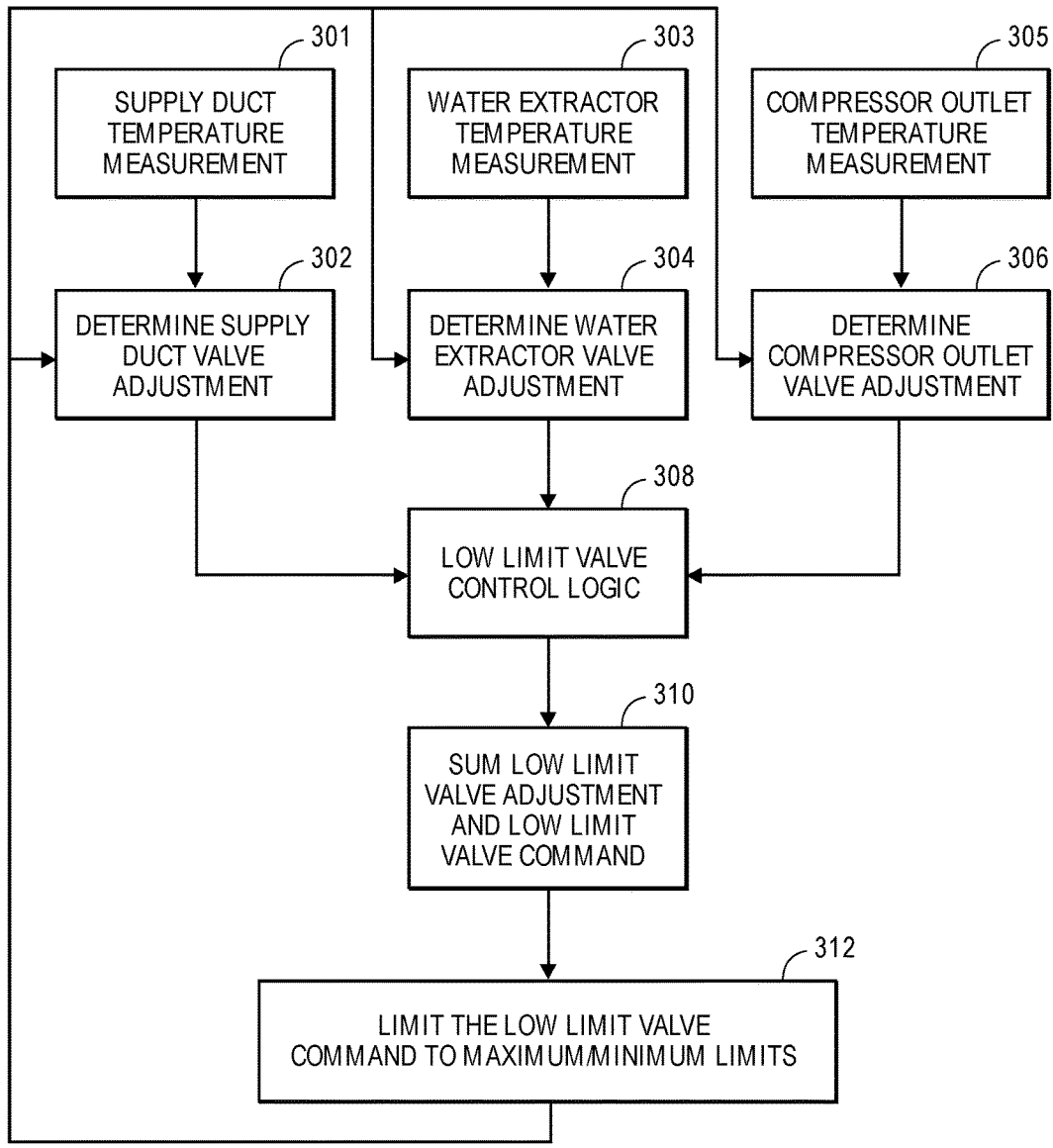
Figure 4A:
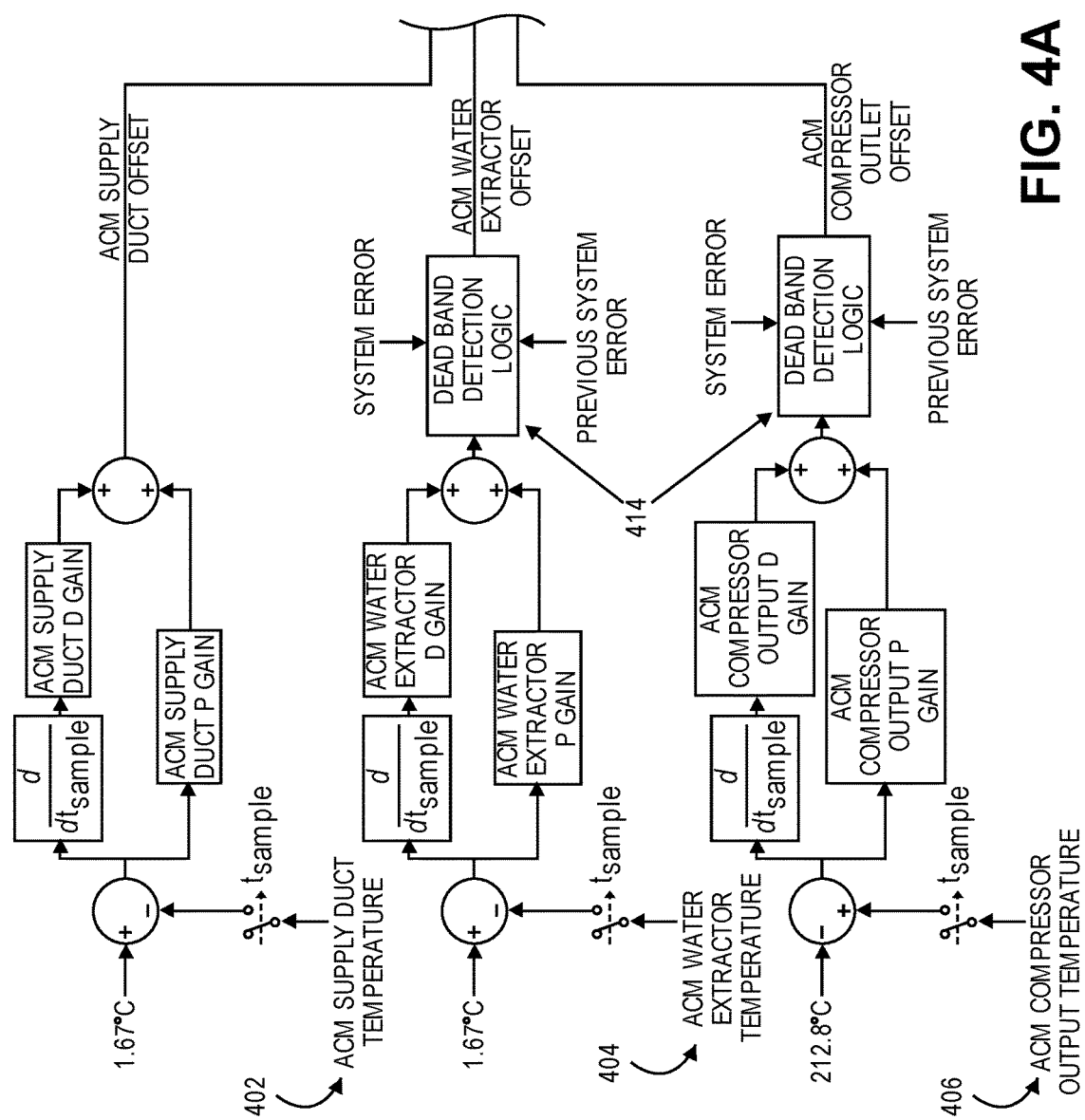
Figure 4B:
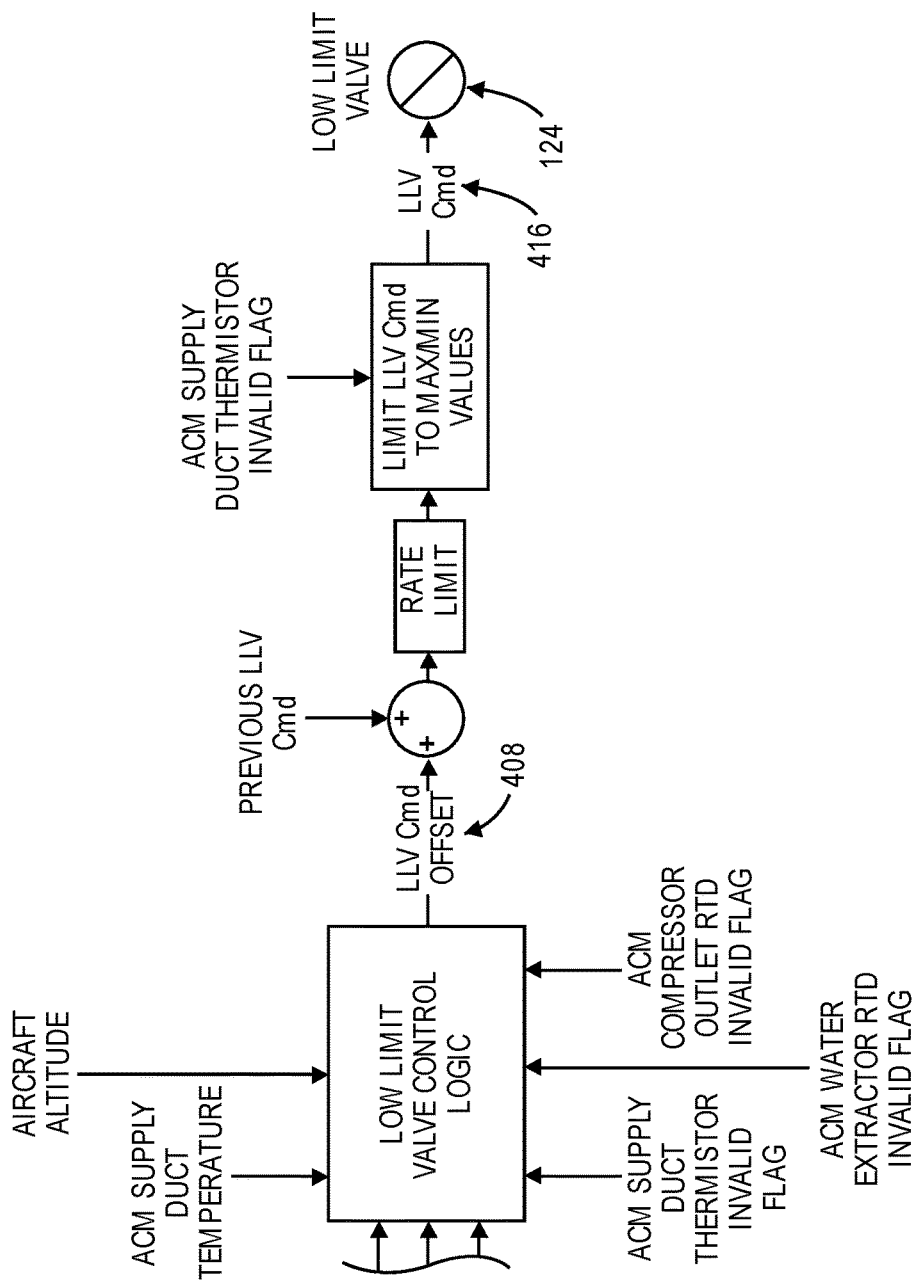

Illustrative embodiments of the invention are described in detail below with reference to the attached drawing figures, which are incorporated by reference herein and wherein:

FIG. 1 is a system diagram depicting an embodiment for a disclosed environment; and FIG. 2 is an information flow diagram reflecting a valve-control environment; and FIG. 3 is a high-level flow diagram showing an embodiment; and FIG. 4*a* and FIG. 4*b* is an embodiment for the controller used to operate the low limit temperature control valve.

DETAILED DESCRIPTION

Embodiments disclosed herein include a system and a method for protecting a system from overheating. Compressors have critical operable temperatures. In order to prevent damage to, e.g., an ACM compressor and/or other components, the compressor outlet temperature must be maintained within specified limits. The disclosed ACM compressor temperature control system forecasts the developing problem and takes preventative measures to prevent overheating. The system utilizes an active feedback control loop to control the outlet temperature of the ACM compressor below the overheat threshold. The control loop software is executed by a processor contained on a Printed Circuit Board (PCB) assembly, collectively, the "controller". These processes monitor a compressor outlet temperature sensor on the ACM in order to provide direct control of a low limit temperature control valve on the ACM. Both the forecasting of an overheating condition, as well as the implementation of the actions necessary for prevention, are executed by processes running on the controller working in concert with electronic controls.

FIG. 1 shows an embodiment for an ACM. Referring to the figure, the ACM system 100 includes a primary heat exchanger 102, a compressor 104, a compressor temperature sensor 106, and a secondary heat exchanger 110. On another side of the system, a re-heater 112 operates in cooperation with a condenser 114 which operates in conjunction with a water extractor 116 having an associated water extractor temperature sensor 118 which will be referred to as the water extractor loop. A turbine inlet temperature sensor 120 is disposed prior to the turbine 122 inlet. After the exit of turbine 122, a low-limit control valve 124 exists in a duct 126 which introduces bleed air from a bleed air source 128.

The compressor 104 is just one part of the overall ACM. When in operation, bleed air from source 128 enters the primary heat exchanger 102 via branch conduit 108. The heat exchanger 102 removes heat from the air. The cooled air from the exchanger 102 enters the compressor 104 via conduit 140. The compressor 104 increases the pressure of the bleed air, which is introduced into outlet conduit 142 (as well as, optionally, branch 144 depending on mode of operation). Due to the physics of compressible fluids, the compression process increases the temperature of the air. A temperature sensor 106 in conduit 142 monitors the air temperature at the outlet of the compressor 104. The air then enters the secondary heat exchanger 110 to remove the heat added by the compression process. After this, the air, via conduit loop 146, enters the reheater heat exchanger 112, which removes heat from the air. The extracted heat is used later in the cycle to warm the air prior to entering the turbine 122.

After the reheater 112, the air (via link 148) enters the cooling side of condenser heat exchanger 114. The condenser heat exchanger 114 further removes heat from the air traveling therethrough, causing the air temperature to be low enough to condense liquid water. As the air passes through conduit 150, any liquid water condensed from the air is collected by the water extractor 116, and transmitted through a condensate pipe 152, and then transmitted into a ram air duct 154 by a nozzle 156.

Temperature sensor 118 in a conduit 158 at the outlet to the water extractor 116 monitors the temperature. After the water extractor 116, the air goes back through the other side of the reheater 112 in conduit 160. The air picks up heat prior to entering the turbine 122. Temperature sensor 120 at the inlet to the turbine 122 monitors the air temperature. The air expands across the turbine 122, which cools the air to temperatures below the freezing point of water. The air then passes through the warming side of condenser heat exchanger 114, which warms the air exiting the turbine 122. The air proceeds through the distribution/supply ducting 166 into the cabin 162.

A valve 164 existing in conduit 144 running between the outlet conduit 160 of the reheater 112 and the outlet of compressor 104 exists to, upon opening, allow compressor air to increase the temperature of the air at the inlet to the turbine 122, if the inlet temperature falls below about 21° C. The valve 164 contains an integral thermostatic element which opens the valve 164 in response to low turbine 122 inlet temperature below 21° C. The valve 164 opens or closes only as necessary to maintain the 21° C. threshold.

Additionally, it is, in embodiments, advantageous to combine the predictive time versus temperature analysis executed by the controller 168 along with the conventional process already in existence, e.g., providing a warning whenever a maximum temperature is exceeded, and then warning a user (e.g., pilot).

A control system 168, which in the disclosed embodiment utilizes control loop processes running on a processor contained on a Printed Circuit Board (PCB) assembly on the aircraft. These computer processes are used to operate the low limit control valve 124 in a way that prevents overheating. Referring now to FIG. 2, which is a simple block diagram illustrating the overall controls executed by system 168 (which may comprise a computing device, microcontroller, logic operator, programmable logic controller, or numerous other devices capable of executing logic based commands), the control system 168 modulates the position of the low limit valve 124. The low limit valve 124 bypasses warm bleed air (from source 128) around the ACM, in order to control the ACM temperatures. The goal is to keep the ACM outlet temperature and the water extractor outlet temperature at a target temperature just above the freezing point of water, e.g., about 1.67° C. in embodiments. To achieve this, the temperature controller 168 modulates the low limit valve open (to raise the temperature toward about 1.67° C. in embodiments) or closed (to lower the temperature toward about 1.67° C. in embodiments).

While the low limit valve operation has this effect on the ACM outlet and water extractor outlet temperatures (measured by sensors 121 and 118 respectively), it has the opposite effect on the compressor outlet temperature (measured by sensor 106). Because the flow of bleed air from bleed air source 128 is nearly constant, modulating the low limit valve 124 open has the effect of reducing flow to the compressor and thus decreasing the compressor outlet temperature (at sensor 106), while closing has the effect of increasing flow to the compressor and thus increasing the compressor outlet temperature. The temperature controller 168 has been configured to take advantage of this effect to control the compressor outlet temperature using logic executed thereon. In embodiments, the controller 168 actively controls the compressor outlet temperature to about 212.8° C. In this manner, the temperature controller anticipates a compressor overheat, and actively controls the temperature to prevent a compressor overheat.

An embodiment for these processes is disclosed in a process 168 shown in FIG. 2. The water extractor temperature 201 and the supply duct temperature 203 are subtracted from the desired water extractor temperature 202 and the desired supply duct temperature 204 respectively. In this embodiment, the desired compressor outlet temperature 206 is subtracted from the measured compressor outlet temperature 205. The dynamic compensation is determined for the water extractor temperature 201, supply duct temperature 203, and the compressor outlet temperature 205 at steps 208, 212, and 214. The dynamic compensation output is the corresponding valve adjustment value needed to maintain the air temperature in the supply duct 166 at approximately 1.67° C., at the compressor 104 outlet at approximately 212.8° C., and at the water extractor 116 outlet at approximately 1.67° C. An exemplary embodiment of a method for determining these values is presented in FIG. 4 where a proportional derivative type control method is used. This is an example that in no way limits the system to this method. The dynamic compensation outputs 212, 208, and 214 are input into the low limit control logic that, as described in elsewhere in this application, determines the low limit valve adjustment. The outputs 208, 212, and 214 are represented in FIG. 3 as the supply duct valve adjustment 302, the water extractor valve adjustment 304, and the compressor outlet valve adjustment 306 respectively.

An embodiment for these processes, at a high level, is disclosed in a process 300 shown in FIG. 3. The ACM supply duct air is to be maintained at a temperature slightly above freezing (e.g. about 1.67° C.). The ACM supply duct air temperature 203 is measured by supply duct temperature sensor 121. Along with the previous low limit valve command, this measurement is supplied to the controller where the ACM supply duct valve adjustment 302 is determined as represented in an embodiment in FIG. 4 and referred to as the ACM supply duct offset. The ACM supply duct valve adjustment 302 is sent to the low limit valve control logic 308.

In an embodiment, the ACM water extractor air is to be maintained at a temperature slightly above freezing (e.g. about 1.67° C.). The ACM water extractor temperature 201 is measured by the water extractor temperature sensor 118. Along with the previous low limit valve command, this measurement is supplied to the controller where the ACM water extractor valve adjustment 304 is determined as represented in FIG. 4 and referred to as the ACM water extractor offset. The ACM water extractor valve adjustment 304 is sent to the low limit valve control logic 308.

In an embodiment, the ACM compressor outlet temperature 205 is to be maintained at a temperature of about 212.8° C. The ACM compressor outlet temperature 205 is measured by the compressor outlet temperature sensor 106. Along with the previous low limit valve command, this measurement is supplied to the controller where the ACM compressor outlet valve adjustment 306 is determined as represented in an embodiment in FIG. 4 and referred to as the ACM compressor outlet offset. The ACM compressor outlet valve adjustment 306 is sent to the low limit valve control logic 308.

The low limit valve control logic 308 determines which of the three valve adjustment values, supply duct valve adjustment 302, water extractor valve adjustment 304, or compressor outlet valve adjustment 306, should be used. This is determined by using sensor validity data, the ACM supply duct temperature, and aircraft altitude 216 data. The output is stored as the low limit valve adjustment. The low limit valve adjustment is then added to the previous low limit valve command 310 and the new low limit valve command is limited between a maximum and a minimum value 312.

An embodiment is disclosed where the low limit valve control logic 210 uses the supply duct valve adjustment 302, the water extractor valve adjustment 304, the compressor outlet valve adjustment 306, aircraft altitude 216, and measurement validity data to control the low limit valve 124. When the supply duct temperature 203 is in a range considered to be normal, and all measurements are determined to be valid, the value of the low limit valve adjustment is set to the value of the valve adjustment (302,304,306) that is the largest value; this will result in the valve adjustment (302, 304, 306) being used that will result in the Low Limit Valve being driven to the more open position. When the supply duct temperature 203 is in a range considered to be near overheat and all measurements are determined to be valid, the low limit valve adjustment is set to the value of the supply duct valve adjustment 302. Since the probability of ice forming in the ACM water extractor 116 at altitudes above 30,000 ft is minimal, the temperature control PCB assembly may inhibit the water extractor temperature 404 control loop whenever the aircraft altitude is greater than about 30,000 ft. When any one or two of the temperature measurements (301, 303, 305) are invalid, the effected control loop's valve adjustment (302, 304, 306) will be inhibited from being used as the low limit valve adjustment. Thus, the low limit valve adjustments will be based on the remaining valid sensor readings if any one or two of the temperature sensor readings are invalid. More specifically, the low limit valve will be adjusted using the readings from the cabin-supply-duct sensor if the temperature readings from the water extractor and compressor outlet sensors are invalid. Similarly, the low limit control valve will be adjusted using the water extractor adjustment if the temperature readings from the cabin supply duct and compressor outlet sensors are invalid. Further, the low limit valve will be controlled using the compressor outlet adjustment if the temperature readings from the cabin-supply duct sensors and the water-extractor outlet are invalid. If all three of the temperature measurements (301, 303, 305) are invalid, the low limit valve adjustment will be set to the minimum allowed value.

Using these processes, the temperature controller anticipates a compressor overheat and actively controls the temperature to prevent a compressor overheat.

FIG. 4 shows an even more specific embodiment for the logic flow executed by controller 168 used to operate the low limit valve 124.

In the FIG. 4 embodiment, the temperature control PCB assembly 168 controls the ACM supply duct temperature 402, which may be the same as 203, ACM water extractor temperature 404, which may be the same as 201, and ACM compressor outlet temperature 406, which may be the same as 205, within the safe operating limits of the system by controlling the position of the low limit valve 124. The temperature control PCB assembly 168 controls the position of the low limit valve 124 using a current source driver. The pneumatics of the low limit valve 124 provide a counter force to the spring-loaded actuator such that if the valve loses pneumatic pressure, or the temperature control PCB assembly 168 loses power, the low limit valve 124 may move to the full closed position. The pneumatics of the low limit valve 124 are vented to the ambient tailcone pressure, so that the position of the valve versus the current characteristics of the low limit valve 124 change with aircraft altitude. Moving the low limit valve 124 in the open direction increases the amount of hot bleed air mixed with the cold turbine 122 outlet air, which increases the ACM supply duct temperature 402 and the ACM water extractor temperature 404. Moving the low limit valve 124 in the open direction also decreases the amount of bleed air flow into the ACM compressor 104 inlet, which decreases the ACM compressor outlet temperature 406.

In an embodiment, the temperature control PCB assembly 168 may use three separate proportional-derivative control loops to calculate the low limit valve 124 command offsets that are required to maintain the ACM supply duct temperature 402, ACM water extractor temperature 404, and the ACM compressor outlet temperature 406, within the safe operating limits of the system. This is again exemplary and in no way limiting to this particular method. The ACM supply duct temperature 402 control loop may calculate the low limit valve command offset 408, associated with the low limit valve adjustment, required to maintain the ACM supply duct temperature 402 at about 1.67° C. The ACM water extractor temperature 404 control loop may calculate the low limit valve command offset 408 required to maintain the ACM water extractor temperature 404 at about 1.67° C. The ACM compressor outlet temperature 406 control loop may calculate the low limit valve command offset 408 required to maintain the ACM compressor outlet temperature 406 at about 212.8° C. The temperature control PCB assembly 168 may then increase or decrease the low limit valve 124 position based on the control loop offset that would result in the low limit valve 124 moving to the more open position.

In an embodiment the temperature control PCB assembly 168 may use dead band detection logic 414 in the ACM water extractor temperature 404 control loop and the ACM compressor outlet temperature 406 control loop to increase the system's response when the low limit valve 124 is operating within its hysteresis dead band position. This dead band detection logic 414 may monitor the system's error and convergence; if the system sustains an unacceptable error without converging, then the dead band detection logic 414 may increase the overall system gain until the system begins to converge, or until the system is operating within an acceptable steady state error.

If one or two of the system's temperature sensors (106, 118, or 121) are invalid, then the temperature control PCB assembly continues to control the low limit valve based on the remaining valid sensors. If all three of the system's temperature sensors (106, 118, and 121) are invalid, then the temperature control PCB assembly 168 moves the low limit valve 124 to the full closed position.

In order to protect the aircraft's ACM supply duct 166 from over heat conditions, the temperature control PCB assembly 168 may override the normal control laws and allow the ACM supply duct temperature 402 control loop to control the low limit valve 124 if the ACM supply duct temperature 402 is in a near over heat condition.

The temperature control PCB assembly 168 may apply the low limit valve command offset 408 to the low limit valve command 416 at a limited rate. Adding/Subtracting the low limit valve command offset 408 to the low limit valve command 416 at a limited rate serves the function of integrating the low limit valve command offsets 408 over time.

The temperature control PCB assembly 168 may limit the low limit valve command 416 to values between about 0 mA and 100 mA. In order to protect the ACM supply ducts 166 from over heat conditions, the temperature control PCB assembly 168 may limit the low limit valve command 416 to values less than about 37 mA if the ACM supply duct temperature 402 temperature reading is invalid.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

We claim:

1. A system for preventing overheating of a compressor in an aircraft environmental system, the system including a source of bleed air; a compressor configured to receive the bleed air from the source, compress the bleed air, thus elevating the air temperature, and release the air from a compressor outlet; a condenser and a water extractor arranged to accept air from the compressor and extract water, a turbine configured to receive the air from an outlet from the water extractor, and expand the air resulting in a decreased air temperature, the expanded air being released from a turbine outlet and then being introduced into a cabin of the aircraft; and a control valve positioned between the source of bleed air, the turbine outlet, and the cabin; the control valve being capable of varied levels of openness, and being positioned to divert bleed air from the source, bypass the compressor, and direct the bleed air into the cabin, wherein the improvement comprises:

a processor configured to modulate an extent of openness of the control valve to enable a portion of the bleed air to bypass the compressor based at least in part on a temperature reading taken in the system based on a plurality of air-temperature measurements taken from one or more of: (i) an outlet conduit of the water extractor; (ii) a compressor outlet conduit; or (iii) a conduit located between the turbine outlet and the cabin, thus the system maintaining a compressor operating temperature.

2. The system of claim 1, wherein a first air temperature measurement is made using a sensor positioned at the water extractor outlet.

3. The system of claim 2, wherein a second air temperature measurement is made using a sensor positioned at the compressor outlet.

4. The system of claim 3, wherein a third air temperature measurement is made using a sensor positioned prior to the entrance into the cabin of the aircraft.

5. The system of claim 4, wherein a turbine inlet temperature is measured by a sensor positioned at the turbine inlet.

6. The system of claim 1, further comprising a second valve being positioned between the compressor outlet and the turbine inlet to allow compressed air to increase the temperature of the air entering the turbine.

7. The system of claim 1 wherein the control valve is a low limit control valve.

8. A system comprising:
a source of bleed air from an engine;
an air-conditioning system between the engine and an aircraft cabin, the air-conditioning system including:
a compressor configured to receive the bleed air from the source, compress the bleed air, thus elevating the air temperature, and release the air from a compressor outlet;
a turbine configured to receive the air from the compressor, and expand the air resulting in a decreased air temperature, the expanded air being released from a turbine outlet, and then being introduced into a cabin of the aircraft;
a flow-control valve positioned between the source of bleed air, the turbine outlet, and the cabin;
a plurality of sensors positioned in different locations in the air-conditioning system between the engine and cabin, the sensors being positioned to read temperatures reflective of a compressor temperature condition; and
a processor configured to receive readings from the plurality of sensors to continually and dynamically change the extent of openness of the flow-control valve to enable varying portions of the bleed air to bypass the compressor, the processor also configured to dynamically operate the flow-control valve such that compressor operating temperatures are maintained below a maximum to prevent overheating of the compressor.

9. The system of claim 8 wherein the flow-control valve is a low limit control valve.

10. The system of claim 8 wherein the processor is configured to modulate the extent of openness by dynamically compensating for each of a plurality of readings received from the plurality of sensors.

11. The system of claim 10, wherein the plurality of sensors are located at: (i) an outlet conduit of the water extractor; (ii) a compressor outlet conduit; and (iii) a conduit located between the turbine outlet and the cabin.

12. The system of claim 10 wherein the processor is configured to modulate the extent of openness using all of the plurality of readings received from the plurality of sensors.

13. A system comprising:
a source of bleed air;
a compressor configured to receive the bleed air from the source, compress the bleed air, thus elevating the air temperature, and release the air from a compressor outlet;
a turbine configured to receive the air from the compressor, and expand the air resulting in a decreased air temperature, the expanded air being released from a turbine outlet, and then being introduced into a cabin of the aircraft;
a low-limit control valve positioned between the source of bleed air, the turbine outlet, and the cabin, the flow control valve enabling a bypass flow around the compressor and turbine and into the cabin;
a plurality of sensors positioned in different locations in said system, the sensors being positioned to read temperatures directly reflective of a compressor temperature condition; and
a control system configured to dynamically receive the temperature from the plurality of sensors to continually and dynamically compensate using the low-limit control valve for the compressor temperature condition by modulating the amount of bypass flow versus a remaining amount of bleed air flow.

\* \* \* \* \*